United States Patent
Glaeser et al.

(10) Patent No.: US 12,555,368 B2
(45) Date of Patent: Feb. 17, 2026

(54) METHOD FOR TEMPORAL CORRECTION OF MULTIMODAL DATA

(71) Applicant: Robert Bosch GmbH, Stuttgart (DE)

(72) Inventors: Claudius Glaeser, Ditzingen (DE); Fabian Timm, Renningen (DE); Florian Drews, Renningen (DE); Michael Ulrich, Stuttgart (DE); Florian Faion, Staufen (DE); Lars Rosenbaum, Lahntal (DE)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 18/337,153

(22) Filed: Jun. 19, 2023

(65) Prior Publication Data
US 2023/0419649 A1 Dec. 28, 2023

(30) Foreign Application Priority Data
Jun. 23, 2022 (DE) .................. 10 2022 206 346.5

(51) Int. Cl.
*G06V 10/82* (2022.01)
*G06V 10/75* (2022.01)
*G06V 10/776* (2022.01)
*G06V 10/80* (2022.01)

(52) U.S. Cl.
CPC .......... *G06V 10/82* (2022.01); *G06V 10/751* (2022.01); *G06V 10/776* (2022.01); *G06V 10/80* (2022.01)

(58) Field of Classification Search
CPC .... G06V 10/82; G06V 10/751; G06V 10/776; G06V 10/80
See application file for complete search history.

(56) References Cited

U.S. PATENT DOCUMENTS

| | | | |
|---|---|---|---|
| 9,770,172 B2* | 9/2017 | Sturm | A61B 8/4416 |
| 10,650,253 B2* | 5/2020 | Bayer | G06F 18/253 |
| 11,210,560 B2* | 12/2021 | van Baar | G06T 7/38 |
| 11,263,524 B2 | 3/2022 | Arel | G06F 18/24137 |
| 11,443,515 B2* | 9/2022 | Shrestha | G06N 5/04 |
| 11,600,074 B2* | 3/2023 | Sherman | G06N 3/045 |
| 11,610,112 B2* | 3/2023 | Engel | G01J 3/28 |
| 11,994,615 B2* | 5/2024 | Alvarez | G01S 13/931 |
| 12,354,342 B2* | 7/2025 | Lee | G06V 10/62 |
| 2019/0018722 A1* | 1/2019 | Ramanath | G06F 17/18 |
| 2021/0382469 A1* | 12/2021 | Zhou | G05B 23/024 |

* cited by examiner

*Primary Examiner* — Manav Seth
(74) *Attorney, Agent, or Firm* — Maginot, Moore & Beck LLP

(57) ABSTRACT

A method for the chronological correction of multimodal data includes:
receiving a first data set from a reference sensor with measurements at different measurement timepoints,
receiving a second data set of a second sensor with measurements at different measurement timepoints, each not exactly matching those of the reference sensor,
reading the first and the second data sets by a neural network and identifying a respective plurality of feature vectors for the first and second data set at the respective measurement timepoints,
merging and comparing the respective feature vectors, which refer to corresponding, not exactly matching measurement timepoints, by the neural network so that parameters of a chronological correction are identified, and
identifying a chronological offset between the respective measurement timepoints of the reference sensor and the second sensor, and/or a corrected data set from the second sensor based on the measurement timepoints of the reference sensor.

17 Claims, 3 Drawing Sheets

METHOD FOR TEMPORAL CORRECTION OF MULTIMODAL DATA

This application claims priority under 35 U.S.C. § 119 to patent application number 10 2022 206 346.5, filed on Jun. 23, 2023 in Germany, the disclosure of which is incorporated herein by reference in its entirety.

The present disclosure relates to a method for the chronological correction of multimodal data, with the aim of identifying a chronological offset between measurement timepoints of data sets from different, non-synchronous sensors. The disclosure also relates to a method for training a neural network with the aim of being able to perform an aforementioned method for chronological correction of multimodal data. The disclosure also relates to a computer program which implements one of the aforementioned methods, a machine-readable data storage medium and/or a download product having such a computer program, as well as one or multiple computers comprising the aforementioned computer program.

BACKGROUND

Advanced Driver Assistance Systems (ADAS) and Autonomous Driving (AD) systems require accurate representation of the vehicle environment. Increasingly, machine learning (ML) is used for this purpose. The use of multiple sensors (sensor fusion) is expected to lead to better results in the detection of the environment. Since the sensors are not measuring synchronously, the data of multiple sensors are often converted to a common timepoint for sensor fusion. In general, the timestamps of the sensor data required for the aforementioned conversion are in this case not known or only with insufficient accuracy.

Multimodal data are typically divided into individual chronological steps (referred to as frames), in which case each frame, e.g., references a measurement of each sensor. Given that the sensors typically do not measure accurately at the same time, the chronological offset between the individual measurements of a frame must be known. If the movement of the sensors (e.g., in a vehicle) and the movement of objects (e.g., other vehicles or pedestrians) that may be present in the scene is known, the chronological offset can be used to predict the measured sensor data to a common timepoint.

If a chronological error (the difference between two measurement timepoints assumed to be synchronous in a frame) is not corrected, then the method for learning has similar consequences as an error in extrinsic calibration.

SUMMARY

In the context of the disclosure, a method for the chronological correction of multimodal data is proposed. The aim of this method is to identify a chronological offset between the measurement timepoints of data sets from different, non-synchronous sensors and to then synchronize the data sets to common reference timepoints. In other words, the corrected data sets then each contain data related to the common reference timepoints. The method thereby comprises at least the steps described hereinafter.

In a first method step, a first data set from a reference sensor is received with measurements at different measurement timepoints. In a further method step, a second data set from a second sensor with measurements at different measurement timepoints each not exactly matching those of the reference sensor, is received. The first and second data sets are then read by a neural network. A plurality of feature vectors for the first and second data sets at the respective measurement timepoints is subsequently identified by the latter network. In a following method step, the neural network in each case merges and compares the first and second feature vectors, which refer to corresponding measurement timepoints that do not match exactly. Parameters of a chronological correction are in particular identified thereby. In the subsequent method step, a chronological offset between the respective measurement timepoints is then identified. This can be performed by means of the neural network, or independently of the neural network by using the parameters of a chronological correction identified by the network. Additionally or alternatively, a corrected data set from the second sensor related to the measurement timepoints of the reference sensor can be identified. This corrected data set from the second sensor contains the data that the second sensor would have measured if it had measured at the same measurement timepoints at which the reference sensor also measured. The value identified for the chronological offset between the measurement timepoints of the reference sensor and the second sensor, and/or the corrected data set from the second sensor related to the measurement timepoints of the reference sensor, can then be output.

Accordingly, by means of the method described herein, data can be converted to a common timepoint after recording. This can in particular reduce the requirements for other synchronization measures (e.g., software timestamps instead of hardware timestamps, peer-to-peer synchronization) of the sensors. This reduction of the aforementioned synchronization measures is associated with a significant cost reduction.

Furthermore, one advantage of the method proposed herein is that the chronological error of multimodal data is reduced. Typically, the lower the abstraction of the data, the more important the synchronization is. For example, if a current system fuses tracked objects using a camera and radar, then the raw data (camera images and radar reflections) of the sensors, e.g. in a common tracker, can already be fused with improved synchronization. Doing so in turn increases the quality of tracking results.

It is further advantageous that, by means of the method described hereinabove and hereinafter, data sets for training machine learning methods can be included without much synchronization and can then be corrected in time by means of the method described hereinabove and hereinafter. Doing so can in turn significantly reduce costs that may arise in connection with a necessary synchronization of data recorded with an unintended chronological offset for training purposes of another machine learning procedure not described herein.

A particular advantage of the method presented herein over the existing method is that the exact measurement timepoints of the sensors need not be known in order to convert the measurement data to a reference timepoint. This either saves additional costs for the synchronization or enables new algorithms regarding the sensor fusion, which would not have been feasible without accurate synchronization. This includes, e.g., a fusion of raw data of different sensors.

Compared to a correction using only the data of a measurement timepoint of the reference sensor and the corresponding measurement timepoint of the second sensor—e.g. via a correlation analysis—the advantage of the method presented herein is that it can be learned from the training data as to how chronological errors express themselves in the data. In particular, a better correction can be achieved as a result.

One example from daily life, in which the synchronization is applicable according to the method proposed herein, is editing video material. For example, if the image was recorded with a video camera and the sound was recorded with a separate recorder to improve sound quality, the image and sound may not initially be synchronized. Thus, for example, the mouth movements of a speaker do not match the words being spoken. The chronological offset is also not necessarily constant, as the chronological bases of both recording devices used for the recording can fluctuate with each other. The neural network can learn to check the plausibility of the spoken words to the mouth movements and derive therefrom indications for determining and correcting the chronological offset.

According to one exemplary embodiment, different sensors of the same or different measurement principle, in particular radar, lidar, ultrasonic, and/or camera sensors, are selected as the reference sensor and second sensor. Especially in the monitoring of vehicles in the environment, data of such sensors is fused. In particular, a single sensor cannot provide data of consistent quality seamlessly in all situations, but a fusion of data from multiple sensors that act physically differently can. Environmental monitoring as a whole must function seamlessly.

According to an exemplary embodiment, the measured values of the reference sensor as well as the measured values of the second sensor are each projected into a selected coordinate system. From the result of this projection, the neural network extracts first feature vectors related to the reference sensor and second feature vectors related to the second sensor. Through the projection, the measured values can in particular be converted into a form that requires a neural network of a predetermined architecture, for example. Adapting the data to the architecture requires less effort than adapting the architecture to the data.

For example, the aforementioned selected coordinate system can be given by a 2-dimensional or 3-dimensional Cartesian coordinate system.

According to one exemplary embodiment, in a further method step, a third data set from a third sensor is further received with measurements at different measurement timepoints not exactly matching those of the reference sensor and those of the second sensor. A chronological offset between the measurement timepoints of the reference sensor and the third sensor is then identified in a manner similar to the method steps in the case of the second data set by means of a separate neural network. By considering more sensors, a more comprehensive picture of the situation captured by the sensors can be generated.

In accordance with an exemplary embodiment—initially as also described for the preceding exemplary embodiments—a third data set from a third sensor is received with measurements at different measurement timepoints which do not exactly match those of the reference sensor and those of the second sensor. A chronological offset between the measurement timepoints of the reference sensor and the third sensor is then identified in a manner similar to the method steps in the case of the second data set by means of the same neural network. The difference with the preceding exemplary embodiment is that, in the exemplary embodiment described herein, the same neural network used in connection with the data of the second sensor is used again—but in the previous case a separate neural network is used.

According to one exemplary embodiment, the data sets each relate to environmental detection of a vehicle environment and/or a traffic situation by a system having corresponding sensors. The aforementioned sensors are, e.g., installed in a vehicle for assistance-based and/or autonomous driving, or are part of a traffic monitoring system. As explained hereinabove, a fusion of the data of several sensors is particularly well-suited to ensure seamless environmental monitoring in general, although not every sensor used can seamlessly function in all situations on its own.

According to one exemplary embodiment, a control signal is identified based on the analysis of the data sets related to a common reference timepoint. This actuation signal is in this case designed to trigger the initiation of braking, the initiation of acceleration, the control of the steering system for initiating cornering, the control of lighting, the control of the hazard warning system, and/or the control of the windscreen wipers as an action in a vehicle. The probability that the respective triggered response of the traffic situation detected using the data sets is then advantageously increased.

Furthermore, the disclosure relates to a method for training a neural network for use in the method described hereinabove. The method for training in this case comprises at least the steps described hereinafter. In a first method step, training examples are provided. These each include at least a first data set from a reference sensor and a second data set from a second sensor. In a subsequent step, the first and second data sets are processed using the method described hereinabove into a chronological offset value and/or to a corrected data set from the second sensor. In the following method step, the value for the chronological offset and/or the corrected data set is evaluated with a predetermined cost function in terms of its quality. Subsequently, parameters and weights of the neural network are optimized. The latter optimization is performed with the aim of improving an assessment obtained with the further processing of training examples by the aforementioned, predetermined cost function. In this way, the neural network learns, by its power to generalize, to synchronize even unseen data sets of sensor data of the reference sensor on the one hand and the second sensor on the other hand.

According to one exemplary embodiment, the aforementioned predetermined cost function measures a plausibility of or conformity with the chronological offset or the corrected data set with, e.g., a target output previously known for the respective training. Thus, in the form proposed in this exemplary embodiment, it is a supervised learning approach in the context of training. Previous knowledge in the form of the target output can then be exploited.

According to one exemplary embodiment, the aforementioned predetermined cost function measures the fulfillment of a similarity condition and/or consistency condition between the corrected data set on the one hand and the first data set on the other hand. This variant is thus a self-supervised learning approach in the context of training. This variant is characterized in that manual labeling of training examples with target outputs is not required.

According to one exemplary embodiment, the cost function specified hereinabove measures a quality of a processing product. The above processing product has thereby been identified by downstream processing of the corrected data set and/or by a downstream processing of the second data set with additional use of the chronological offset identified. In this exemplary embodiment, the "loss", i.e. the cost function, from the downstream processing is "recycled". Furthermore, doing so avoids the introduction of artifacts during the correction, which would particularly interfere with the desired downstream processing.

According to a further exemplary embodiment, the measurement timepoints of each of the reference sensors and the second sensor are precisely known in the context of training. Furthermore, a speed of the platform supporting both sensors as well as potential other speeds of objects in the field of view of the sensors are identified. The speed of the platform carrying both sensors can correspond to the self-movement of the sensors, i.e., the sensors are in this case firmly connected to the platform. However, it is also possible for the sensors to have at least one moving component relative to the platform. Such possibly additionally provided speed components can also be identified. The aforementioned platform can be part of a vehicle or robot. If the sensors are, e.g., part of a column with radar and camera sensor, which can be positioned on the roadside or a road intersection, then the aforementioned self-movement does not take place. In the latter case, however, the speeds of further objects in the field of view of the sensor or sensors, such as other road users, can be identified. Of course, this can also be performed in the case where sensors are also transported on a self-moving vehicle or robot. In a further method step, a comparison data set from the further sensor related to the measurement timepoints of the reference sensor is identified. The previously determined speeds and the precisely known chronological offset between the respective measurement timepoints of the sensors are used for this purpose. In this context, for example, a physical model regarding the dynamics of the sensors, vehicles, robots and other objects involved can be used. Furthermore, the aforementioned comparison data set is compared to the corrected data set identified by the neural network by means of a cost function. For example, this can be done by considering the mean square error from the difference of the corresponding data sets. Following the comparison by means of the cost function, the parameters and weights of the neural network can be adjusted with respect to an anticipated future minimization of the cost function.

According to one exemplary embodiment, the cost function specified in the previous embodiment is based on metrics that quantify the similarity of point clouds. In other words, geometric or photometric criteria can be used as a cost function. For example, the chamfer distance can be used in this context.

According to one exemplary embodiment, as part of the method for training, the chronological offset identified by the neural network is fed into an algorithm to be trained for environmental detection. The cost function, which characterizes the quality of a performed environmental detection, is then also used to determine the quality of the chronological offset identified. Ultimately, it is precisely this quality that is important, e.g., in the at least partially automated control of a vehicle.

Furthermore, the disclosure relates to a computer program comprising machine-readable instructions which, when executed on one or multiple computers, prompt the computer(s) to perform one of the methods described earlier and described hereinafter. The disclosure also comprises a machine-readable data medium on which the above computer program is stored, and/or a download product with the above computer program, as well as a computer equipped with the aforementioned computer program or the aforementioned machine-readable data medium.

Further measures improving the disclosure are described in greater detail hereinafter in reference to the drawings, together with the description of the preferred exemplary embodiments of the disclosure.

BRIEF DESCRIPTION OF THE DRAWINGS

Shown are.

DETAILED DESCRIPTION

Figure 1:
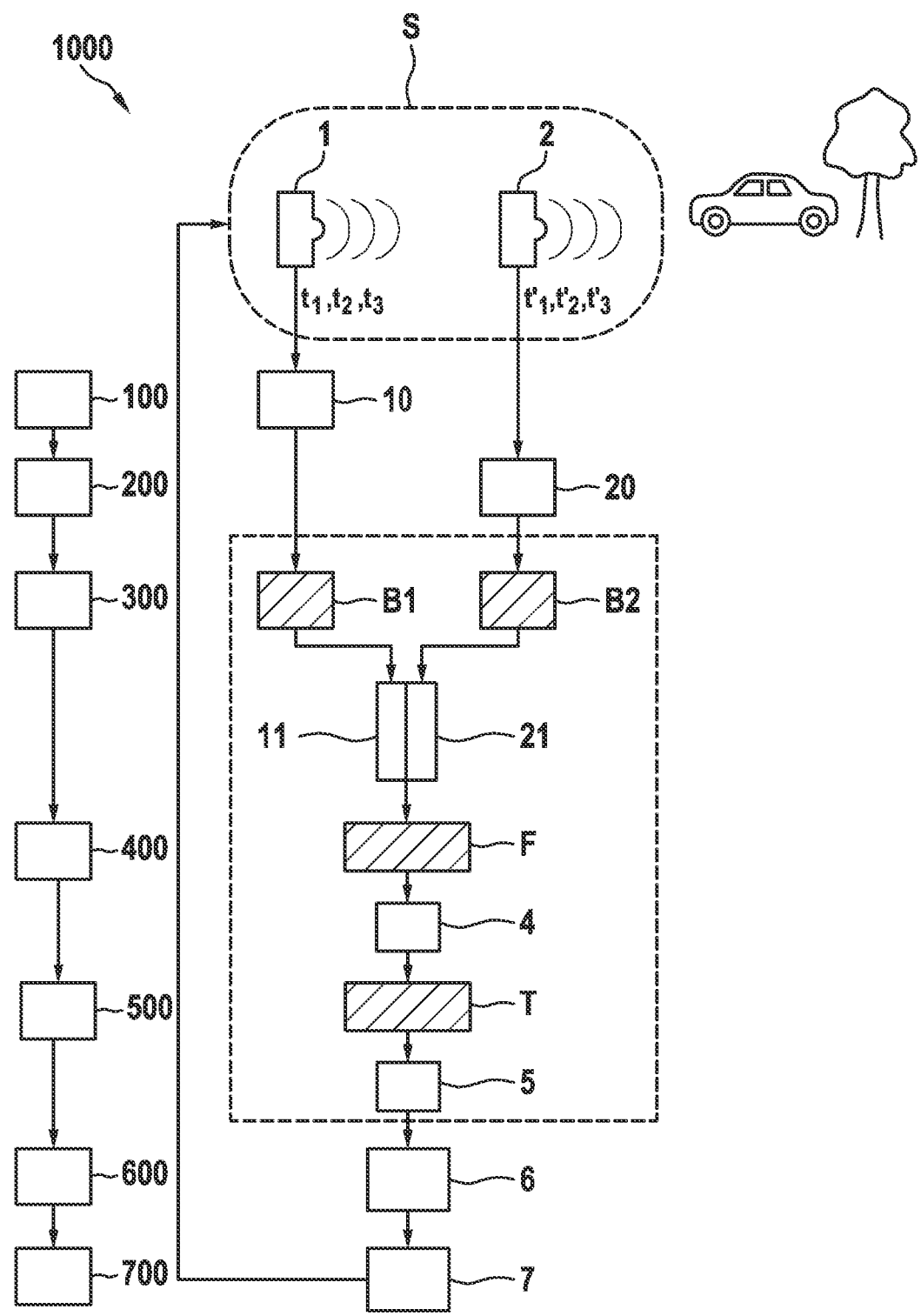
FIG. 1 an exemplary embodiment of a method 1000 for the chronological correction of multimodal data.

FIG. 1 shows an exemplary schematic flowchart of a method 1000 for the chronological correction of multimodal data. The aim of method 1000 is to identify a chronological offset between the measurement timepoints $t_1$, $t_2$, $t_3$; $t'_1$, $t'_2$, $t'_3$ of data sets 10, 20 from different, non-synchronous sensors 1, 2 of a sensor arrangement S and to then synchronize the data sets for common reference timepoints. The sensors 1, 2 can be different sensors of the same or different measurement principle, e.g., radar, lidar, ultrasonic, and/or camera sensors. In a first method step 100, a first data set 10 from a reference sensor 1 with measurements at different measurement timepoints $t_1$, $t_2$, $t_3$ is received. In the next step 200, a second data set 20 from a second sensor 2 with measurements at different measurement timepoints $t'_1$, $t'_2$, $t'_3$, each not exactly matching those of the reference sensor, is received. In the next method step 300, the first data set 10 and the second data set 20 are read by a neural network, and a plurality of feature vectors 11, 21 are in each case identified for the first data set 10 and the second data set 20 at the respective measurement timepoints $t_1$, $t_2$, $t_3$, and $t'_1$, $t'_2$, $t'_3$. This can be performed by respective backbones B1 or B2 of a separate or a common neural network, which in each case process the data of the reference sensor 1 and the second sensor 2. In step 400, the first feature vectors 11 and the second feature vectors 21 are merged and compared, each relating to corresponding, but not exactly matching, measurement timepoints—i.e. $t_1$ and $t'_1$, $t_2$ and $t'_2$, $t_3$ and $t'_3$. Fusion layers F of a neural network are used for this purpose, which in this step in particular also identify parameters 4 of a chronological correction. By means of a further function, T, a chronological offset 5 between the respective measurement timepoints and/or a corrected data set 6 from the second sensor 2 related to the measurement timepoints of the reference sensor 1 is then determined in step 500 using the parameters 4. In method step 600, a value 5 is output for the chronological offset between the measurement timepoints of reference sensor 1 and the measurement timepoints of the second sensor 2 and/or the output of the corrected data set 6 from the second sensor 2 based on the measurement timepoints $t_1$, $t_2$, $t_3$ of the reference sensor 1.

For example, the measured values of the reference sensor 1 as well as the measured values of the second sensor 2 can each be projected into a selected coordinate system, e.g., a 2-dimensional or 3-dimensional Cartesian coordinate system, in method step 300. Based on the result of this projection—further within step 300—first feature vectors 11 related to reference sensor 1 and second feature vectors 21 related to second sensor 2 can in each case be extracted by backbones B1, B2 of a separate or a common neural network.

For example, data sets 10 and 20 can be reflex lists of radar or lidar sensors 1 and 2. During the (pre-) processing by the backbones B1 and B2 within step 300 of a method described herein, the reflex lists can each be projected into a Cartesian grid, and thereby multiple data points can fall within a grid cell. Multiple layers of a neural network then process this representation. In the simplest case, both the reference sensor 1 and the second sensor 2 use the same representation after the (pre-) processing described hereinabove, i.e., a 2-dimensional Cartesian grid in bird's eye view. Then—still within step 300—the output layers of the two backbones B1 and B2 are merged (in a concatenated manner). In the example with the Cartesian grid in a bird's eye view, the feature vectors 11, 21 of the two sensors 1 and 2 are concatenated for each x-y cell of the grid. The fused feature vectors 11, 21 thereby concatenated are then processed in step 400 of the method by further layers F of a neural network. In the aforementioned example with a bird's eye view Cartesian grid, these could be 2-dimensional folding layers (2D convolutional layer).

Parameter 4 of a chronological correction can be calculated or extracted based on the output of the fusion layers F. The parameters 4 can also be provided with a chronological correction directly through the output of the fusion layers. Based on the parameters 4 of a chronological correction, as well as possibly further parameters, which can also be obtained as output of the fusion layers, the entries of multiple transformation matrices (with rotation and spatial as well as temporal translation) can be calculated. In the example hereinabove with the Cartesian grid in a bird's eye view a corresponding transformation matrix could, e.g., be calculated for each grid cell, the entries of which can be linked to parameters 4 of the chronological correction. In other words, the entries of the respective transformation matrix can in each case be provided by known functions of parameters 4—as well as other potential parameters which are also obtained as an output from the fusion layers. In the aforementioned case of the Cartesian grid, it is advantageous to, e.g., choose the (relative) speeds of the sensors and the (relative) angular speed as parameter 4, and thus as output of the fusion layers F. By means of a further function, T, a chronological offset 5 between the respective measurement timepoints and/or a corrected data set from the second sensor 2 related to the measurement timepoints of the reference sensor 1 can then be determined using the parameters 4. Instead of the (angular) speeds, however, the transformation matrices can, e.g., also be directly selected as an output from the fusion layers F. By means of a suitable function T, related to this case, a chronological offset 5 can be identified. Another option is to calculate the chronological differences of the measurement per grid cell. In this case, the self-movement measurement (e.g., by a further sensor) is still required in order to identify a chronological offset 5. Another option is thereby provided for also using layers of a neural network to calculate the chronological offset. These layers can also use inputs from other sensors, e.g., those associated with the self-movement measurement.

Regardless of which of the aforementioned options is selected, it is advantageous for the transformation to be differentiable. Otherwise, the layers of the neural network—backbones and fusion layers—cannot be trained by back propagation. The aforementioned options for calculating the transformation are advantageously derived from the parameters of the chronological correction.

In the example implementation of FIG. 1 described hereinabove, a transformation matrix per cell of the Cartesian grid can be used, i.e., a local correction is performed. Alternatively, a transformation matrix could also be calculated for the entire scene, corresponding to a global correction. Global correction has the advantage of a more robust estimate, but the different movement of different objects in the scene cannot be modeled with a global transformation matrix. The parameters 4 of the chronological correction, i.e. the output of the fusion layers, e.g. given by relative speeds, can then be calculated per grid cell or globally for the entire scene, depending on whether a transformation matrix per cell or a global transformation matrix is desired. If no Cartesian x-y grid is used in the previous processing, then a different representation can be used for a local correction. For example, if a three-dimensional grid is used, then parameters and transformation matrices can be calculated per voxel. If a point-processing network is used, then a transformation matrix can be calculated for each point (e.g., lidar point or radar reflection).

In a manner similar to the method described in connection with FIG. 1, a third data set from a third sensor can be received with measurements at different measurement timepoints not exactly matching those of the reference sensor 1 and those of the second sensor 2, respectively, and, in a manner similar to the method steps in the case of the second data set 20, a chronological offset between the measurement timepoints of the reference sensor 1 and the third sensor can be identified by means of a separate neural network.

On the other hand, in a manner similar to the method described in connection with FIG. 1, a third data set from a third sensor can be received with measurements at different measurement timepoints not exactly matching those of the reference sensor 1 and those of the second sensor 2, respectively, and, in a manner similar to the method steps in the case of the second data set 20, a chronological offset between the measurement timepoints of the reference sensor 1 and the third sensor is identified by means of the same neural network as in the case of the data from the second sensor 2.

The data sets 10, 20 in FIG. 1 can each refer to the environmental detection of a vehicle environment and/or a traffic situation by a system S with corresponding sensors 1, 2. Tensors 1, 2 can in this case be installed in a vehicle S for assistance-based and/or autonomous driving. However, it is also possible that the sensors 1, 2 be part of a system S used for traffic monitoring.

According to FIG. 1, step 600 is followed by further method step 700, in which a control signal 7 is identified based on the analysis of the data sets related to a common reference timepoint, and the control signal 7 is designed to trigger, as an action in vehicle S, the initiation of braking, the control of acceleration, the control of the steering system for initiating cornering, the control of the lighting, the control of the hazard light system, and/or the control of the windscreen wipers.

Figure 2:
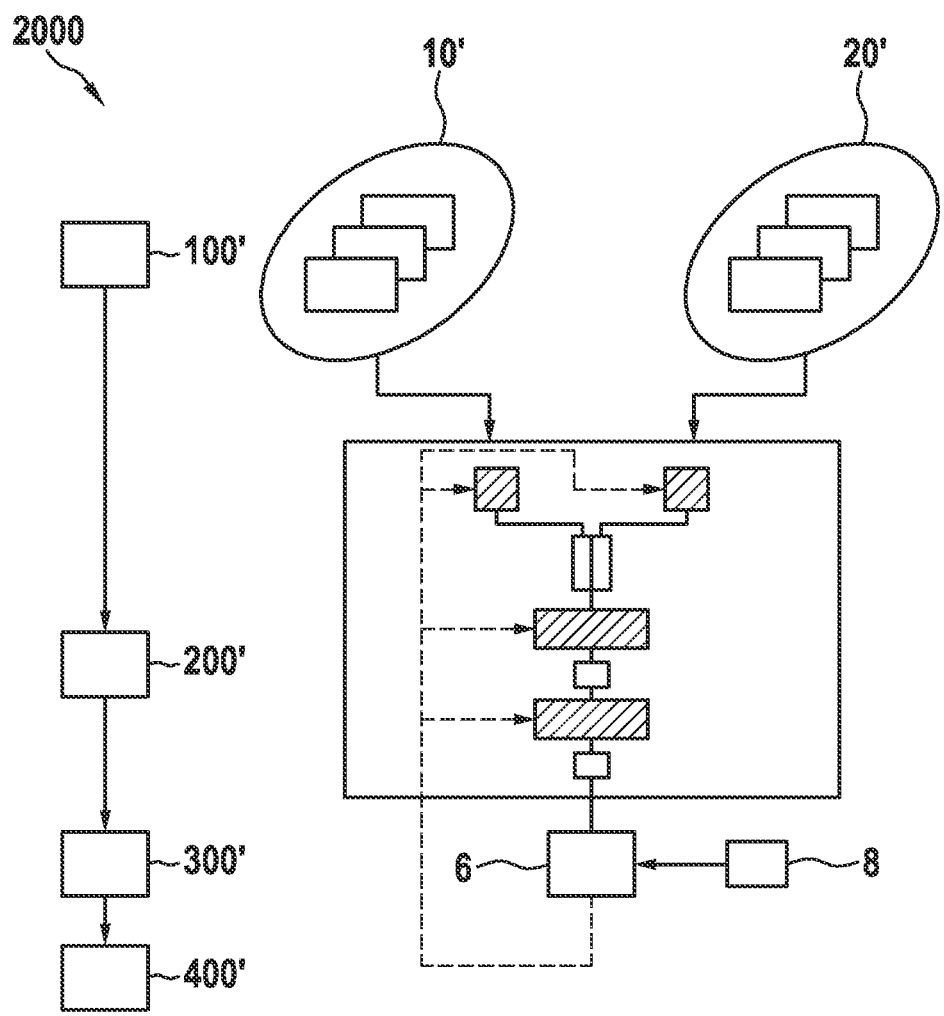
FIG. 2 an exemplary embodiment of a method 2000 for training a neural network for use in method 1000.

FIG. 2 shows a schematic flow diagram of an example of steps of a method 2000 for training a neural network for, e.g., use in a method shown in FIG. 1. According to FIG. 2, in a first step 100', training examples are provided, each containing at least a first data set 10' from a reference sensor 1 and a second data set from a second sensor 2. In a subsequent step 200', the first data set 10' and the second data set 20' are processed using a method shown in FIG. 1 into a value for the chronological offset 5 and/or to a corrected data set 6 from the second sensor 2. The value for the chronological offset 5 and/or the corrected data set 6 is then evaluated in step 300' with a predetermined cost function 8 in terms of its quality. In the subsequent step 400', parameters and weights of the neural network—which occur in the backbones B1, B2, the fusion layers F, or the function T—are optimized. This optimization is performed with the goal of improving the assessment obtained by the cost function 8 using the further processing of training examples 10', 20'.

It is possible that, e.g., the aforementioned cost function 8 measures a plausibility of or conformance with the chronological offset or the corrected data set using a target output previously known for the respective training example. It is also possible that cost function 8 measures the fulfillment of a similarity condition and/or consistency condition between corrected data set 6 on the one hand and first data set on the other hand. Furthermore, the cost function 8 can measure a quality of a processing product identified by downstream processing of the corrected data set 6 and/or by a downstream processing of the second data set 20 with additional use of the chronological offset 6 identified.

Figure 3:
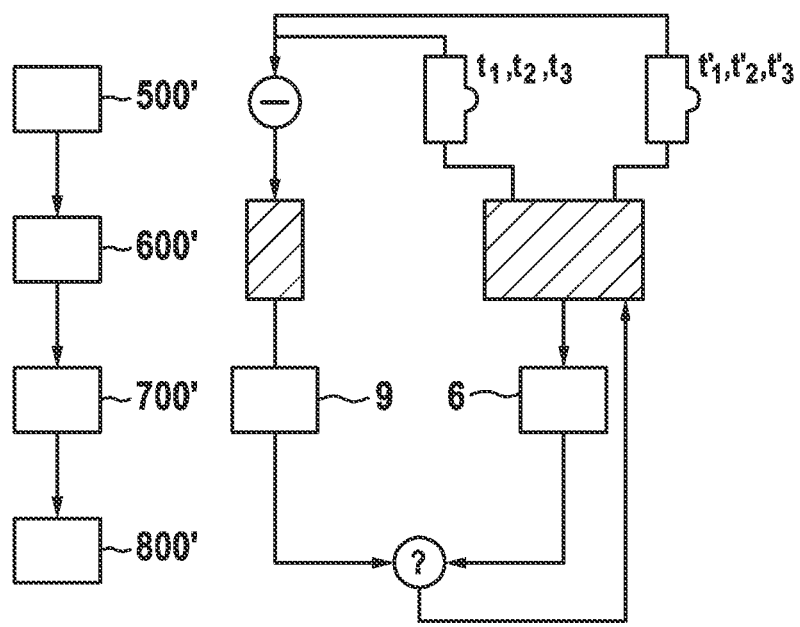
FIG. 3 an exemplary embodiment of a further method 3000, which is based on the method 2000.

FIG. 3 shows further steps of a method 3000 for training a neural network for use, e.g., in a method according to FIG. 1. This method is based on the method 2000 explained in connection with FIG. 2. In the example shown in FIG. 3, the measurement timepoints for both reference sensor 1 and second sensor 2 are precisely known. In step 500', a speed of the platform supporting both sensors 1 and 2 as well as potential other speeds of objects in the field of view of the sensors are further identified. Based on the speeds identified and the precisely known chronological offset between the respective measurement timepoints of the sensors 1 and 2, a comparison data set 9 from the further sensor 2, which is related to the measurement timepoints of the reference sensor 1, is identified in step 600'. The comparative data set 9 is then compared in step 700' by means of a cost function with the corrected data set 6 identified by the neural network and, in view of minimizing the cost function, the parameters and weights of the neural network are adjusted in step 800'.

The cost function described in connection with FIGS. 2 and 3 can be in particular based on metrics quantifying the similarity of point clouds.

Instead of the method described in FIG. 3, or also in combination therewith, it is also possible that the chronological offset identified by the neural network be fed into an algorithm to be trained for environmental detection, and the cost function, which characterizes the quality of a completed environmental detection, is also used to determine the quality of the chronological offset identified.

The invention claimed is:

1. A method for chronological correction of multimodal data, comprising:
   receiving a first data set from a reference sensor with measurements at different respective measurement timepoints;
   receiving a second data set from a second sensor with measurements at different respective measurement timepoints, each of the different respective measurement timepoints not exactly matching those of the reference sensor;
   reading the first and the second data sets by a neural network and identifying a respective plurality of feature vectors for the first and second data sets at the different respective measurement timepoints;
   merging and comparing the respective pluralities of feature vectors by the neural network so that parameters of the chronological correction are identified; and
   identifying a chronological offset between the different respective measurement timepoints of the reference sensor and the second sensor, and/or a corrected data set from the second sensor based on the different respective measurement timepoints of the reference sensor.

2. The method according to claim 1, wherein the reference and second sensors use a same or different measurement principles, in particular radar, lidar, ultrasonic, and/or camera sensors.

3. The method according to claim 1, wherein measured values from the reference sensor as well as the measured values from the second sensor are each projected into a selected coordinate system, and the respective pluralities of feature vectors are extracted based on a result of these projections by the neural network.

4. The method according to claim 3, wherein the selected coordinate system is a 2-dimensional or 3-dimensional Cartesian coordinate system.

5. The method according to claim 1, further comprising:
   receiving a third data set from a third sensor with measurements at different respective measurement timepoints not exactly matching those of the reference sensor or those from the second sensor; and
   identifying a chronological offset between the respective measurement timepoints of the reference sensor and the third sensor using a separate neural network.

6. The method according to claim 1, further comprising:
   receiving a third data set from a third sensor with measurements at different respective measurement timepoints not exactly matching those of the reference sensor or those from the second sensor; and
   identifying a chronological offset between the different respective measurement timepoints of the reference sensor and the third sensor using the neural network.

7. The method according to claim 1, wherein the data sets each relate to environmental detection of a vehicle environment and/or a traffic situation by a system having corresponding sensors installed in a vehicle for assistance-based and/or autonomous driving, or which are part of a traffic monitoring system.

8. The method according to claim 1, further comprising:
   identifying a control signal based on analysis of the data sets related to a common reference timepoint, the control signal being configured to trigger, as an action in a vehicle, initiation of braking, control of acceleration, control of a steering system for initiating cornering, control of lighting, control of a hazard light system, and/or control of windscreen wipers.

9. A method for training a neural network for use in the method according to claim 1, comprising:
   providing training examples containing at least a first training data set from the reference sensor and a second training data set from the second sensor;
   processing the first and second training data sets using the method according to claim 1 into a training value for the chronological offset and/or into a training corrected data set from the second sensor;
   evaluating the value for the training chronological offset and/or the training corrected data set using a predetermined cost function in terms of its quality; and
   optimizing parameters and weights of the neural network to improve an assessment obtained by the cost function with further processing of the training examples.

10. The method according to claim 9, wherein the cost function measures a plausibility of or conformance with the training chronological offset or the training corrected data set with a target output previously known for the respective training example.

11. The method according to claim 9, wherein the cost function measures fulfillment of a similarity condition and/or consistency condition between the training corrected data set and the first training data set.

12. The method according to claim 9, wherein the cost function measures a quality of a processing product identified by downstream processing of the training corrected data set and/or by downstream processing of the training second data set with additional use of the training chronological offset identified.

13. The method according to claim 9, wherein the different respective measurement timepoints of both the reference sensor and the second sensor are precisely known, the method further comprising:
- identifying a speed of a platform supporting both sensors as well as other potential speeds of objects in a field of view of the sensors;
- identifying, based on the speeds identified and the chronological offset between the different respective measurement timepoints of the sensors, a comparison data set of the second sensor related to the different respective measurement timepoints of the reference sensor;
- comparing the comparison data set with the training corrected data set identified by the neural network using a cost function; and
- adjusting, in view of minimizing the cost function, the parameters and weights of the neural network.

14. The method according to claim 9, wherein the cost function is based on metrics quantifying a similarity of point clouds.

15. The method according to claim 9, wherein the training chronological offset identified by the neural network is fed into an algorithm to be trained for environmental detection and the cost function, which also characterizes the quality of a completed environmental detection to determine the quality of the training chronological offset identified.

16. A non-transitory machine-readable storage medium that stores machine readable instructions that, when executed on one or multiple computers, prompt the one or multiple computers to perform the method according to claim 1.

17. One or multiple computers equipped with the non-transitory machine-readable storage medium according to claim 16.

* * * * *